United States Patent [19]
Stewart

[11] Patent Number: 5,609,520
[45] Date of Patent: Mar. 11, 1997

[54] APPARATUS AND METHOD FOR INJECTING COMPRESSED GAS TO SEPARATE MEAT

[75] Inventor: James M. Stewart, Longmont, Colo.

[73] Assignee: Monfort, Inc., Greeley, Colo.

[21] Appl. No.: 523,016

[22] Filed: Sep. 1, 1995

[51] Int. Cl.⁶ .................................................. A22B 5/16
[52] U.S. Cl. ........................................................... 452/131
[58] Field of Search ........................... 452/131, 125

[56] References Cited

U.S. PATENT DOCUMENTS

| | | | |
|---|---|---|---|
| 537,215 | 4/1895 | Mead | 452/131 |
| 1,377,872 | 5/1921 | Callery | 452/131 |
| 1,764,425 | 6/1930 | Thomas | 452/131 |
| 4,118,830 | 10/1978 | Weiland | 452/131 |

FOREIGN PATENT DOCUMENTS

| | | | |
|---|---|---|---|
| 2571595 | 4/1986 | France | 452/131 |
| 8703005 | 2/1989 | Netherlands | 452/131 |
| 337585 | 11/1930 | United Kingdom | 452/131 |

*Primary Examiner*—Willis Little
*Attorney, Agent, or Firm*—Sheridan Ross P.C.

[57] ABSTRACT

An apparatus and method are described that control the volume and/or pressure of gas injected into an animal carcass to reduce the forces and ergonomic stresses encountered during the separation of meat from adjacent animal bone or tissue. The device and method can utilize stored data to optimize injection parameters to reduce meat contamination and packaging problems resulting from excessive gas retention in packaged meat.

36 Claims, 2 Drawing Sheets

APPARATUS AND METHOD FOR INJECTING COMPRESSED GAS TO SEPARATE MEAT

FIELD OF THE INVENTION

The invention relates to the controlled injection of a compressed gas during the butchering process of an animal to reduce the forces and human ergonomic stresses required to remove meat from an animal carcass. The invention further reduces meat contamination and packaging problems by controlling the type and volume of gas injected during carcass fabrication.

BACKGROUND OF THE INVENTION

The butchering process of animals generally requires the skinning and removal of meat from the animal carcass after the animal has been killed. The extraction of meat from bone and cartilage and the separation of particular meat components is time consuming, expensive, labor intensive and potentially dangerous.

During processing, an animal carcass is commonly suspended from a hook and transported on a rail or tram along a fabrication line having different butchering stations. At each station, workers manually remove different portions of meat and bone for processing and eventual packaging. The removal of specific cuts of meat is generally accomplished manually with repetitive knife cuts to isolate and remove the desired cuts of meat. The process is time consuming and can result in ergonomic stress injuries to workers as a result of the repetitive motion involved during the cutting and separation procedures.

Air injection processes currently known in the art suffer from several significant limitations. First, there exists a danger of meat contamination due to bacterial growth associated with the injection of aerobic, non-filtered gas. Second, contamination may occur if a non-sterilized probe is inserted into the animal carcass. Third, no apparatus is available that controls the pressure, volume, and/or the exact site of injection of compressed air into an animal carcass. Injection of an insufficient volume of air is inefficient, wasteful and the benefits realized are minimal. Moreover, if an excessive volume of air is injected, the processed meat component can retain excessive volumes of residual air which may not be entirely evacuated during subsequent vacuum packaging processes. As excess air that has been forced into the meat is released from the meat product, the meat package may become inflated, giving the packaged meat product a bloated appearance that can easily be mistaken for a spoiled meat product (e.g., it looks as if spoilage bacteria have produced waste gases). Furthermore, the packaged meat product may become contaminated from excessive oxygen content, providing an environment for the undesired proliferation of spoilage and pathogenic bacteria.

Thus, a significant problem exists in meat fabrication plants to provide a sterilized, controlled pressure and volume gas injection system which reduces the forces necessary to remove meat from an animal carcass, thus reducing repetitive stress related injuries and, at the same time, eliminating waste resulting from meat contamination.

SUMMARY OF THE INVENTION

The present invention generally relates to a method and apparatus for controlling the pressure and volume of compressed gas injected into an animal carcass during butchering. By properly regulating these and other parameters, an animal meat component can be separated from adjacent bone, hide, cartilage or other meat components efficiently, safely and in a manner which reduces the ergonomic stresses encountered by workers on a meat processing fabrication line. Thus, work related injuries, downtime, and subsequent medical expenses of workers are reduced. Furthermore, by controlling the volume and/or pressure of gas injected into the meat product, packaging problems and meat contamination are reduced by decreasing the volume of residual gas retained in the meat.

One embodiment of the present invention relates to a method for reducing the human ergonomic stresses encountered during the separation of meat from an animal carcass by injecting a predetermined volume of gas into an animal carcass to loosen the adherence of the meat to an adjacent portion of the animal carcass. The pressure of the gas is preferably regulated, filtered and the flow of gas being injected is controlled.

Another aspect of the present invention relates to an apparatus that reduces the forces necessary to separate meat from bone, cartilage, hide or another meat component of an animal carcass, such apparatus including a source of compressed gas and a means for injecting a predetermined volume of compressed gas to reduce the forces required to separate desired meat portions. Such apparatus can further comprise a means for locating a point of desired injection and can also incorporate a means for controlling the flow of compressed gas from the injection means. Moreover, a means for evacuating residual gas from an animal carcass after injection of compressed gas can also be used. Preferably, the compressed gas comprises a non-oxygen containing gas, such as carbon dioxide, carbon monoxide, nitrogen or combinations thereof. The present apparatus preferably also includes a means for sterilizing the means for injecting. The means for injecting itself is rigid and hollow and preferably is made of a metallic or plastic material that will not discolor or otherwise affect the quality of the meat. The volume of compressed gas can be regulated using a timer, a flow regulator and a means for sending a signal between the timer and the flow regulator. Data storage means and means for communicating a signal between a flow regulation means and a data storage means can also be used in automated systems where varying pressures or volumes of gas, as well as the location of injection sites, are modified to address specific types and sizes of animals. Means for locating a point of injection can include the use of sonar, radar or ultrasonic waves.

A further embodiment of the present invention includes a method for reducing the forces necessary to separate a meat component from bone, cartilage, hide or adjacent meat components comprising the steps of locating a point of injection on a portion of an animal carcass, inserting a means for injecting compressed gas at such injection point, and injecting a predetermined amount of compressed gas into the animal carcass, thereby loosening the adherence of desired meat portions from other adjacent portions of the animal carcass. The average force necessary to separate a particular meat component from the animal carcass is reduced by at least about 20% as compared to forces required to separate such meat components in a conventional manner.

The present invention is also directed to a method for reducing bacterial growth during the packaging of meat products by injecting a predetermined volume of gas into an animal carcass to loosen the adherence of meat to portions of the animal carcass, fabricating the animal carcass to obtain individual cuts of meat, and packaging the fabricated meat in a substantially air impermeable package. The step of injecting of gas is performed so that a minimum amount of gas is absorbed by the meat, thereby minimizing the likelihood of bacterial growth after the meat has been packaged. Filtered, non-oxygen containing gases, such as carbon dioxide and nitrogen, are used to prevent bacterial growth and potential meat contamination. The use of probes or other insertion needles comprised of plastic, stainless steel, nickel plated aluminum or acetal are used to reduce discoloration and to inhibit bacterial contamination of meat products. Moreover, an evacuation means is used to further ensure that gas is not allowed to unduly permeate the meat, thereby reducing the occurrence of post-packaging bloating.

Another embodiment of the invention involves the use of a mechanism associated with an injectable probe that is actuated by the operator's hand. When the hand operated lever is depressed, a signal is sent to open a gas flow control valve. Once a predetermined volume of gas is released at an optimum pressure, the flow control valve closes. In one particular embodiment of the present invention, a timing mechanism is used that is associated with a manually operated probe and a source of compressed gas. When the timing mechanism is activated, gas is allowed to flow through a control valve for a predetermined set period of time, after which time the flow control valve is closed automatically, thus permitting a predetermined volume of air to be injected.

Still other embodiments of the present invention utilize means to optimize the efficiency of the fabrication process by reducing human error through the automatic regulation of gas injection pressures and volume, as well as the positioning of insertion probes. Optimization means may include the use of stored data, such as various types of information related to animal species, breed and/or components of meat which are desired to be removed. By utilizing such data, optimal gas injection volumes, pressures and sites of injection may be automatically controlled to optimize gas injection and eliminate the likelihood of human error.

The present invention also includes the use of robotics and other advanced technologies such as sonar, radar and ultrasound to locate optimal injection locations on the animal carcass. Advanced robotics may additionally be used for the insertion of the sterilized probes once an optimal location is identified. Ideally, an automated system is used which locates the optimum probe insertion location, inserts the sterilized probe, activates and injects a predetermined volume and pressure of non-oxygen containing gas, and subsequently removes the gas insertion probe for sterilization and subsequent reinsertion.

DETAILED DESCRIPTION

The method and apparatus of the present invention is for use in the meat processing industry to improve the efficiency of meat processing by injection of compressed air between the seam of a meat component and adjacent bone, tissue or meat product. By injecting compressed air, the meat is partially torn away from bone or other tissue to reduce the force and number of knife cuts required to selectively remove a predetermined portion of meat from the animal carcass.

The present invention, in its broader aspects, therefore relates to an apparatus and method that reduces the forces and related human ergonomic stress associated with removing meat from an animal carcass. Furthermore, the likelihood of meat contamination and packaging problems is reduced based on the control of volume, pressure, and type of compressed gas injected.

As a side of beef or other portion of an animal carcass is being fabricated in a processing plant, the carcass is generally transported to various stations. At each station, workers make repetitive knife cuts to isolate and remove selected portions of meat. The meat is then often packaged in a clear plastic container so a potential purchaser may view the meat product. To improve the speed and efficiency of meat fabrication, compressed gas is injected between the seam of a meat component and an adjacent bone or other tissue to reduce the forces necessary to remove the meat from the bone or other tissue. Furthermore, by creating a database which utilizes historical animal data and other gas injection parameters, the volume, pressure, orientation and type of air or gas injected into the seam of an animal carcass can be optimized. By controlling these parameters, and utilizing robotics where applicable, the removal of meat from an animal carcass can be performed safely, efficiently, and more economically. Although the processing of beef cattle using the present invention is thought to be the most significant use of the present invention, the present method and apparatus can also be used in the fabrication and processing of sheep, pigs, lamb, buffalo and wild game.

Figure 1:
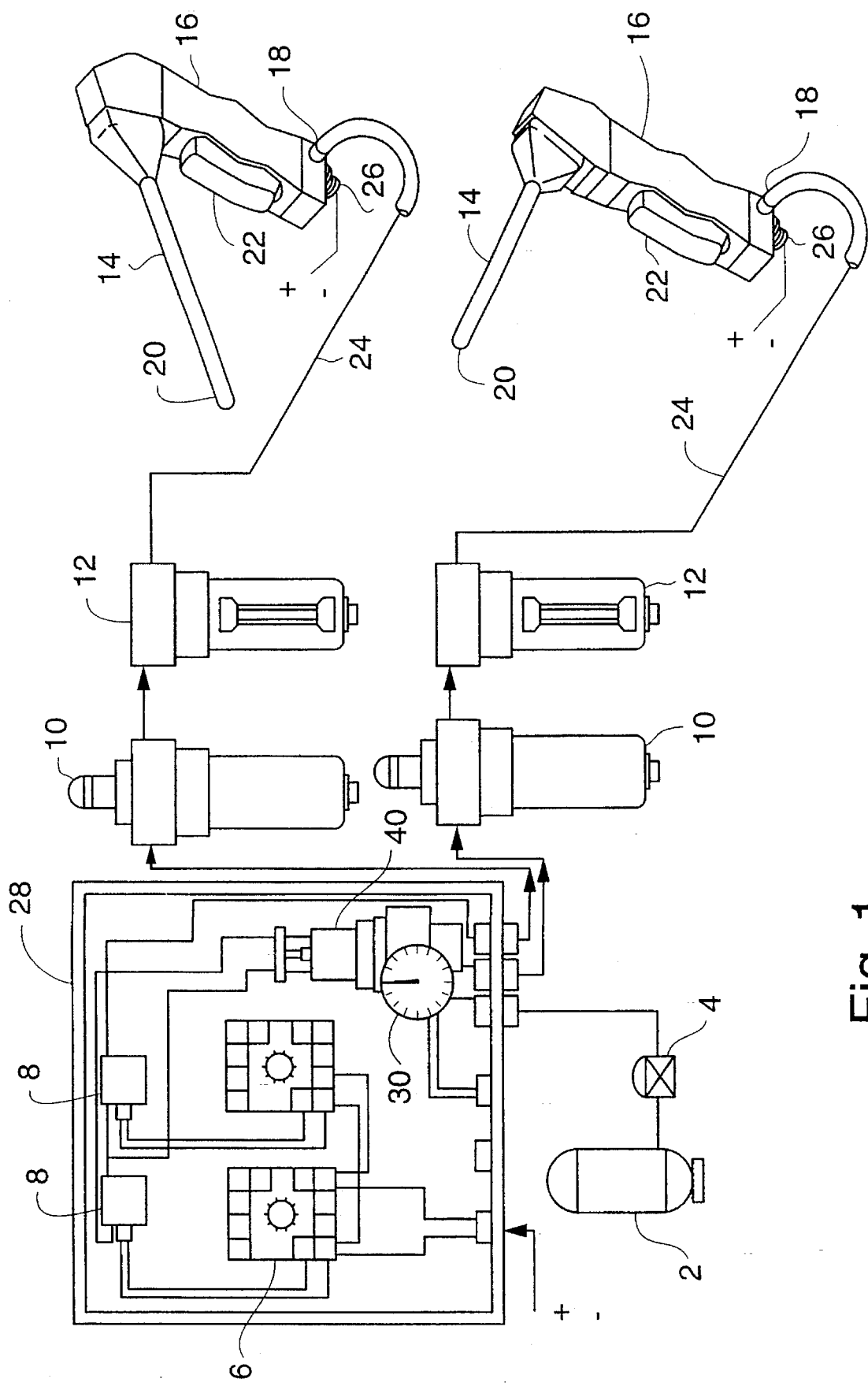
FIG. 1 is a schematic process flow diagram depicting a source of compressed gas, timer, pressure regulator, control valves, filters and hand held probes.

Referring now to the drawings, FIG. 1 depicts a flow schematic generally showing a source of compressed gas 2, pressure regulating valve 4, a volume control mechanism 28, first stage gas filters 10, second stage gas filters 12, and hand held injection probes 14. The invention utilizes either compressed air or gas and reference herein to "gas" includes air. If air is used, a traditional air compressor capable of providing sufficient volumes and pressures to loosen the adherence of meat to adjacent portions of an animal carcass (e.g., at least about 150 psig) is sufficient to operate the system. Preferably, however, a non-oxygen containing gas is used to prevent the contamination of meat resulting from the growth of bacteria during the injection and subsequent packaging of the meat product. These gases include carbon dioxide, air, nitrogen, carbon monoxide, and other non-oxygen containing gasses or combinations thereof known in the art.

If a compressed gas such as carbon dioxide is stored in a vessel 2, the pressures in the vessel 2 may be as high as 2000 to 3000 psig. In such instances, a first stage pressure regulating control valve 4 should be used to decrease the pressure to an operable range between approximately 100 psig and 110 psig. Depending on the desired gas injection pressure it may be necessary to install a second stage pressure control valve 40 to obtain a final system operating pressure of between about 25 psig and 100 psig. A suitable pressure is selected to achieve desired separation of meat from adjacent meat, bone, cartilage or hide. Preferably, a high gas volume pressure (e.g., at least about 50 psig) is used to quickly expand regions between the desired meat portion and its adjacent surroundings. A pressure gauge 30 may be included in or near the volume control mechanism 28 for reference and monitoring of the system pressure.

One aspect of the present invention relates to the injection of a predetermined volume of gas between seams of meat, between meat and bone, between meat and cartilage, and between a hide and the underlying tissue of an animal. The volume of gas for each particular application and for each particular type and size of animal will vary. One of skill in the art, however, will appreciate what particular predetermined volume should be used in each situation. Specifically, a predetermined volume of gas injected into an animal carcass so as to separate a desired meat cut should not be so great as to cause subsequent problems later in the fabrication process. For instance, if too great a volume of gas is injected into an animal carcass, subsequent difficulties can be experienced in the vacuum packaging of the final meat product in that the excessive air used to loosen the adherence of the meat from the carcass can permeate the meat. Later, the gas can be released from the meat and cause undesired bloating of vacuum packaged meat, thereby making such products unsalable due to their appearance of bacterial contamination (e.g., consumers will mistakenly believe that spoilage/pathogenic bacteria have produced gases due to their proliferation on the meat surface). As such, coordination between the vacuum packaging section of a fabrication line and the gas injection section of a fabrication line is required to properly determine the acceptable amount of injected gas volume.

In actual operation, workers on a fabrication line will utilize hand held probes 14 readily available at individual work stations. These probes may be suspended from an overhead manifold of gas injection lines or connected by individual lines to the gas volume control apparatus 28. After identifying a proper location for probe insertion between a seam of meat and other tissue, or between a bone and a meat component, the operator will inject the rigid injection probe 14 into the animal carcass 34. When an adequate depth is reached, the operator activates the injection apparatus by depressing the hand operated activation switch 22. A low voltage electrical signal is then sent to a volume control apparatus 28 which releases a predetermined volume of gas through the flow control valve 8, gas transmission line 24 and eventually through the probe 14. As the compressed gas enters the animal carcass, muscle tissue and other interconnecting tissue around the selected meat portion is forced apart. This reduces the amount of force later required to pull and cut the selected meat portion from adjacent meat or bone of the animal carcass. A summary of test data reflecting the reduction in force necessary to separate meat from bone, tissue or other meat products may be seen in Table 1.

Preferably, the volume control apparatus 28 is comprised of a programmable digital timer 6 capable of sending a signal upon activation to open a flow control valve 8. Once a predetermined time period lapses and a resultant volume of gas is discharged, the flow control valve 8 closes, thus regulating the total volume of gas discharged from the injection probe 14 at any predetermined pressure.

Preferably, the probe 14 used for injection of the compressed gas into the seam of an animal carcass is rigid and generally between about 3 inch and 15 inch long, depending on the required application and depth of insertion required. More preferably, the probe is made of stainless steel, nickel plated aluminum, acetal or other metallic or plastic material which will not discolor or otherwise affect the quality of the meat. More preferably, if stainless steel probes are used, the material should be electro-polished to prevent oxidation of the stainless steel and possible meat discoloration or contamination. Furthermore, the discharge exit port 20 of the probe 14 should have a sharpened, pointed tip to facilitate easy insertion of the probe 14 into the animal carcass. During use, the probe should additionally be sterilized in water or other sterilizing liquids at minimum temperatures of at least 180° F. between injections to inhibit bacterial growth and subsequent meat contamination. Other sterilization means can, however, be used including having the probe heated to kill undesired bacteria, irradiation of the probe, etc.

Figure 2:
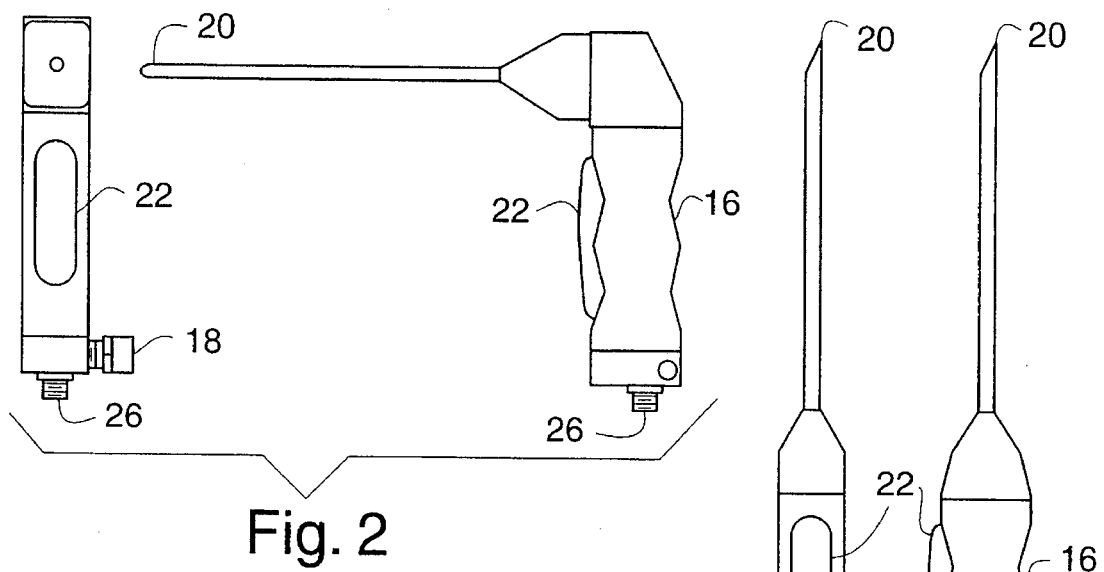
FIG. 2 is a left side view and front view of an injection probe, handle and hand operated switch.
Figure 3:
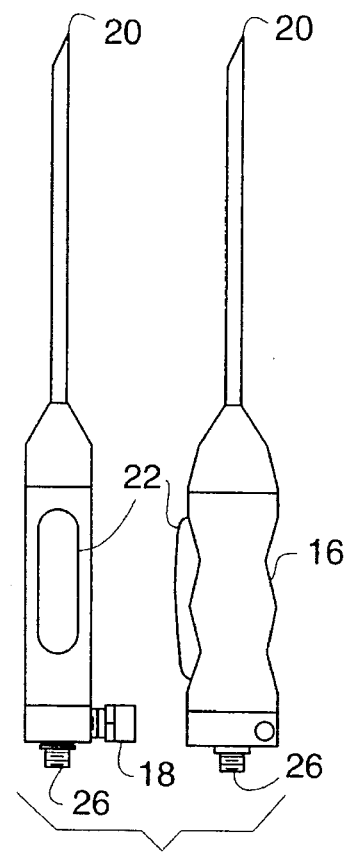
FIG. 3 is a left side view and front view of the injection probe and handle with hand operated switch showing a variation of the injection probe and handle orientation.
Figure 4:
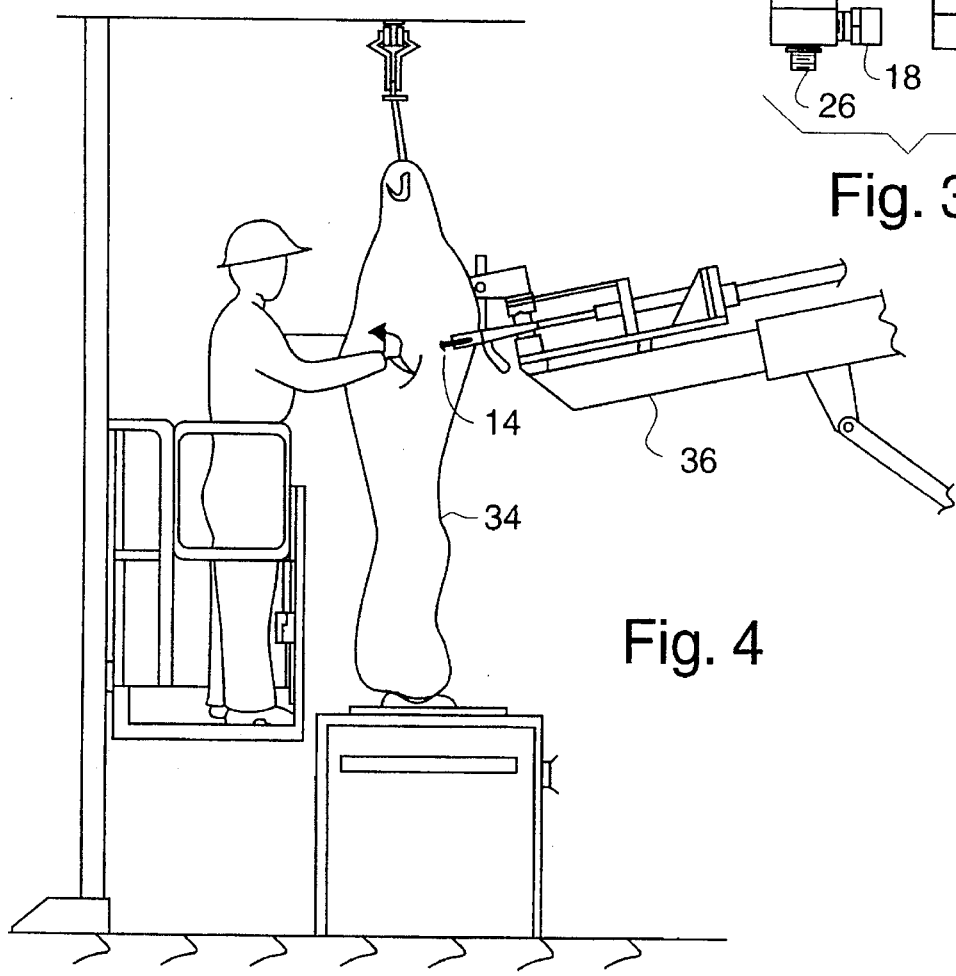
FIG. 4 is a perspective view of a robotic injection arm, animal carcass, rail assembly and fabrication line worker.

Preferably, the injection probe 14 should be integrally attached to a hand-held probe handle 16. The probe handle 16 generally has a gas entry port 18 for connecting a gas transmission line 24 and an electrical port 26 for interconnecting an electrical signal line 32. As seen in FIGS. 2 and 3, depending on the type of application, various probe orientations may be utilized with the probe handle 16 to optimize the efficiency of the injection. For example, FIG. 2 shows a probe with a 90° orientation to the probe handle, while FIG. 4 shows an 180° straight, or dagger type orientation. Other probes with orientations slightly upward, downward or variations between the orientations shown in the figures may obviously be utilized.

The probe handle 16 is designed to comfortably fit in the hand of the operator and allow for force to be applied for insertion of the insertion probe 14 into the animal carcass. In one embodiment, a hand operated activation switch 22 is conveniently and ergonomically located so that the operator can quickly inject gas into the animal carcass. As seen in FIGS. 1–4, the hand operated activation switch 22 is preferably located directly below the fingers of the operator for efficiency. The probe handle 16 may be made of any functional material which is lightweight and durable, such as plastic, aluminum or other similar materials known in the art.

Prior to the injection of any compressed gas through the injection probe 14 and into the animal carcass 34, it is preferable that the compressed gas be filtered to remove any liquids, particulate matter or other impurities. These impurities may encourage bacterial growth and possibly contaminate the selected meat product. Depending on the compressed gas used and particular application, the filtering may be done in one stage or in multiple stages. One particular filter which has been used effectively as a first stage gas filter 10 is a Norgren Model F55-200 LOTA, which removes particulate matter up to 0.3 microns.

A second stage gas filter 12 used downstream of the first stage filter to remove additional particulates and liquids is preferred. One particular such filter is a Norgren Model F08-200 A1DA, which removes particulates and suspended liquids greater than 0.01 microns in size. As an additional benefit, a moisture trap or coalescing filter may be installed immediately prior to the two in-line filters.

Referring now to FIG. 4, in one embodiment of the present invention, robotics and advanced scanning and computer technology are used to improve the efficiency of the meat separation procedure. Preferably, as an animal carcass 34 is transported by an overhead tram or rail 38 to a work station, the carcass 34 is immobilized by a worker or mechanical apparatus. Once stabilized, a scanning device such as sonar, radar, ultrasound or other similar means known in the art is utilized to locate the optimum point or points of injection on the animal carcass. Preferably, these locations will be identified by measuring different densities of tissue and bone, and thus identifying a "seam" for injection.

Once an optimum injection point is identified, the information is used to position the robotic arm 36 into an injection position. The injection probe 14 is then inserted to a predetermined depth into the animal carcass 34 and a signal is sent to the volume control mechanism to release a predetermined volume of gas through the in-line filters, injection probe, and eventually into the seam of the animal carcass. Once the predetermined volume of gas has been injected, the robotic arm 36 retracts the injection probe 14 and resets for the next injection process. Preferably, the entire sequence takes only a matter of seconds. As the injection probe 14 is removed from the animal carcass 34, the line worker can quickly remove the selected portion of meat using a minimum number of knife cuts, thus reducing repetition and possible ergonomic injury.

In accordance with the present invention, various data can be utilized to improve the efficiency of compressed gas injection for removing meat from an animal carcass. For example, numerous parameters dictate the optimum volume and pressure of compressed gas which should be injected into an animal carcass. These parameters include, but are not limited to, the species, age and sex of the animal being butchered, the cut of meat being removed, the temperature of the carcass, the size of the injection probe, the type of gas being injected, packaging considerations, etc.

Thus, by utilizing the aforementioned parameters, an optimum gas volume and pressure can be determined for any processing application. This prevents gas waste, optimizes time and efficiency, and eliminates the need for costly training of generally non-skilled workers. The aforementioned parameters are programmed in a data storage device such as a computer database. A remote keypad or other similar device would then be located in close proximity to the worker or shift supervisor who could input the type of animal being processed, temperature, and other desired process parameters. The key pad information would instantaneously be sent to the computer, which would calculate and automatically adjust the digital timer to regulate the proper volume and/or pressure of gas injected, as well as adjust the depth of insertion of the probe and other variables.

Using the present invention, a significant reduction in human ergonomic stresses can be avoided that are typically encountered in conventional meat fabrication processes. As set forth in the examples below, tests were performed comparing the forces and ergonomic stresses encountered using the present invention as compared with conventional meat processing procedures. The present invention significantly reduces the amount of ergonomic stress encountered by fabrication line workers whether the separation of a desired meat component was directly from the hanging carcass itself or was subsequently separated on fabrication tables.

A list of the components and respective numbers found on the drawings is provided below for reference:

| COMPONENT | NUMBER |
| --- | --- |
| Compressed gas source | 2 |
| First stage pressure regulator | 4 |
| Timer | 6 |
| Flow Control valve | 8 |
| First stage gas filter | 10 |
| Second stage gas filter | 12 |
| Ridged injection probe | 14 |
| Probe handle | 16 |
| Gas entry port | 18 |
| Gas exit port | 20 |
| Hand operated activation switch | 22 |
| Gas transmission line | 24 |
| Electrical port | 26 |

-continued

| COMPONENT | NUMBER |
| --- | --- |
| Volume control mechanism | 28 |
| Pressure gauge | 30 |
| Electrical signal line | 32 |
| Animal carcass | 34 |
| Robotic arm | 36 |
| Tram or rail | 38 |
| Second stage pressure regulator | 40 |

TABLE 1

ERGONOMIC FORCE REDUCTION DATA

| Sample | Force (lbs) to Separate Non-Injected Samples | Force (lbs) to Separate Samples Injected with $CO_2$ |
| --- | --- | --- |
| 1 | 81 | 60 |
| 2 | 79 | 75 |
| 3 | 100 | 75 |
| 4 | 78 | 65 |
| 5 | 84 | 60 |
| 6 | 79 | 62 |
| 7 | 70 | 65 |
| 8 | 94 | 74 |
| 9 | 86 | 70 |
| 10 | 80 | 60 |

While particular embodiments of the invention have been shown and described in detail, it will be obvious to those skilled in the art the changes and modifications of the present invention, and its various aspects, may be made without departing from the invention in its broader aspects, some of which changes and modifications being matters of routine engineering or design and others being apparent only after study. As such, the scope of the invention should not be limited by the particular embodiment and specific instruction described herein but should be defined by the appended claims and equivalence thereof. Accordingly, the aim in the appended claims is to cover all such changes and modifications as followed in the true spirit and scope of the invention.

What is claimed is:

1. A method for reducing the human ergonomic stresses encountered during the separation of meat from an animal carcass, comprising injecting gas into an animal carcass to loosen the adherence of meat to adjacent meat portions and communicating a signal between a data storage means a means for regulating a parameter selected the group consisting of the pressure of said gas being injected, the time period in which said gas is being injected and the volume of said gas being injected.

2. The method of claim 1, further comprising the step of filtering said gas.

3. The method of claim 1, further comprising the step of regulating the pressure of said gas.

4. The method of claim 1, further comprising the step of controlling the flow of gas being injected.

5. The method of claim 4, wherein said step of controlling comprises operation of a manually activated mechanism operatively associated with a source of compressed gas.

6. An apparatus that reduces the forces necessary to separate meat from bone, cartilage, or another meat component of an animal carcass, comprising:

a source of compressed gas;

a means for injecting compressed gas to reduce the forces required to separate said meat from said bone, cartilage, or other meat component; and a means for communicating a signal between a data storage means and a means for regulating a parameter selected the group consisting of the pressure of said gas being injected, the time period in which said gas is being injected and the volume of said gas being injected.

7. The apparatus of claim 6, further comprising a means for regulating the pressure of said compressed gas.

8. The apparatus of claim 6, further comprising a means for filtering said compressed gas.

9. The apparatus of claim 8, further comprising a filter capable of filtering particle sizes greater than 0.01 microns in diameter.

10. The apparatus of claim 6, further comprising a means for locating said point of injection.

11. The apparatus of claim 9, wherein said means for locating utilizes sonar, radar or ultrasonic waves.

12. The apparatus of claim 6, further comprising a means for controlling the flow of said compressed gas from said means for injecting.

13. The apparatus of claim 6, further comprising a means for evacuating residual gas from said animal carcass.

14. The apparatus of claim 6, wherein said compressed gas is comprised of carbon dioxide, carbon monoxide, air, nitrogen, or combinations thereof.

15. The apparatus of claim 6, further comprising a means for sterilizing said means for injecting.

16. The apparatus of claim 6, wherein said volume regulation means comprises a timer, a flow regulator and means for sending a signal between said timer and said flow regulator.

17. The apparatus of claim 6, further comprising means for data storage and means for communicating a signal between said data storage means and said means for regulating the volume of said gas injected.

18. The apparatus of claim 6, wherein said injection means comprises a hollow probe.

19. The apparatus of claim 18, wherein said hollow probe comprises stainless steel.

20. The apparatus of claim 18, further comprising handle means interconnected to said hollow probe.

21. The handle means of claim 6, further comprising means for controlling the flow of compressed gas through said means for injecting.

22. A method for reducing the forces necessary to separate a meat component from bone, cartilage, hide or adjacent meat component comprising the steps of:
  locating a point of injection on a portion of an animal carcass;
  inserting a means for injecting compressed gas at said injection point; and
  injecting a predetermined amount of said compressed gas into said animal carcass to reduce the forces necessary to separate said meat component from bone, cartilage, skin or adjacent meat component and communicating a signal between a data storage means and a means for regulating a parameter selected the group consisting of the pressure of said gas being injected, the time period in which said gas is being injected and the volume of said gas being injected.

23. The method of claim 22, further comprising the step of sterilizing said means for injecting.

24. The method of claim 22, further comprising the step of evacuating residual gas from said animal carcass.

25. The method of claim 22, wherein the force necessary to separate a meat component is reduced by at least about 20% as compared to the force required to separate such meat components in a conventional manner.

26. A method for reducing bacterial growth during the packaging of meat products, comprising:
  injecting gas into an animal carcass to loosen the adherence of meat to adjacent meat portions of the animal carcass and communicating a signal between a data storage means and a means for regulating a parameter selected the group consisting of the pressure of said gas being injected, the time period in which said gas is being injected and the volume of said gas being injected;
  fabricating said animal carcass to obtain individual cuts of meat; and
  packaging said fabricated meat in a substantially air impermeable package wherein said step of injecting is performed so that a minimum amount of gas is absorbed by said meat, thereby minimizing the likelihood of bacterial growth after said meat has been packaged.

27. The method of claim 26, further comprising evacuating excess gas from said meat prior to said packaging step.

28. An apparatus for reducing the forces necessary to separate meat from bones, cartilage, hide or other component of an animal carcass, comprising:
  a source of compressed gas;
  a timer interconnected to a gas flow control valve;
  a handle having a gas entry port, gas exit port and a hand operated switch capable of sending a signal to said timer;
  a gas filter between said handle and said source of compressed gas;
  a hollow probe connected to said gas exit port; and
  a hollow, flexible gas transmission line interconnected between the entry point of said handle and said source of compressed gas, wherein when said hand operated switch is pushed, a signal is sent to said timer which opens said flow control valve for a predetermined period of time to regulate the volume of gas released through said probe.

29. An apparatus that reduces the forces necessary to separate meat from bone, cartilage, hide or another meat component of an animal carcass, comprising:
  a source of compressed gas;
  a means for injecting a predetermined volume of compressed gas at a point of injection to reduce the forces required to separate said meat from said bone, cartilage, hide, or other meat component; and
  a means for locating said point of injection, said locating means utilizing sonar, radar or ultrasonic waves.

30. An apparatus that reduces the forces necessary to separate meat from bone, cartilage, hide or another meat component of an animal carcass, comprising:
  a source of compressed gas;
  a means for injecting a predetermined volume of compressed gas to reduce the forces required to separate said meat from said bone, cartilage, hide, or other meat component; and
  a means for evacuating residual gas from said animal carcass.

31. An apparatus that reduces the forces necessary to separate meat from bone, cartilage, hide or another meat component of an animal carcass, comprising:
  a source of compressed gas; and
  a means for injecting a predetermined volume of compressed gas to reduce the forces required to separate said meat from said bone, cartilage, hide, or other meat component, wherein said injecting means comprises a timer, a flow regulator and a means for sending a signal between said timer and said flow regulator.

32. An apparatus that reduces the forces necessary to separate meat from bone, cartilage, hide or another meat component of an animal carcass, comprising:

a source of compressed gas;

a means for injecting a predetermined volume of compressed gas to reduce the forces required to separate said meat from said bone, cartilage, hide, or other meat component;

a means for data storage; and a means for communicating a signal between said data storage means and said injecting means.

33. A method for reducing the human ergonomic stresses encountered during the separation of meat from an animal carcass, comprising injecting a predetermined volume of gas into an animal carcass to loosen the adherence of meat to portions of the animal carcass, and evacuating residual gas from said animal carcass.

34. A method for reducing the human ergonomic stresses encountered during the separation of meat from an animal carcass, comprising injecting a predetermined volume of gas into an animal carcass to loosen the adherence of meat to portions of the animal carcass, and regulating the volume of said gas using a timer, a flow regulator and a means for sending a signal between said timer and said flow regulator.

35. A method for reducing the human ergonomic stresses encountered during the separation of meat from an animal carcass, comprising injecting a predetermined volume of gas into an animal carcass to loosen the adherence of meat to portions of the animal carcass, and communicating a signal between a data storage means and a means for regulating the volume of said gas being injected.

36. A method for reducing bacterial growth during the packaging of meat products, comprising:

injecting a predetermined volume of gas into an animal carcass to loosen the adherence of meat to adjacent meat portions of the animal carcass and communicating a signal between a data storage means and a means for regulating the volume of said gas being injected;

fabricating said animal carcass to obtain individual cuts of meat;

packaging said fabricated meat in a substantially air impermeable package wherein said step of injecting is performed so that a minimum amount of gas is absorbed by said meat, thereby minimizing the likelihood of bacterial growth after said meat has been packaged; and evacuating excess gas from said meat prior to said packaging step.

* * * * *